(12) United States Patent
Harriman et al.

(10) Patent No.: US 11,156,545 B2
(45) Date of Patent: Oct. 26, 2021

(54) FLUID SAMPLE ENRICHMENT SYSTEM AND METHOD

(71) Applicant: See-Through Scientific Limited, London (GB)

(72) Inventors: Oliver Harriman, London (GB); Irwin Zaid, London (GB)

(73) Assignee: See-Through Scientific Limited, London (GB)

( * ) Notice: Subject to any disclaimer, the term of this patent is extended or adjusted under 35 U.S.C. 154(b) by 319 days.

(21) Appl. No.: 15/968,519

(22) Filed: May 1, 2018

(65) Prior Publication Data
US 2018/0321128 A1    Nov. 8, 2018

(30) Foreign Application Priority Data

May 2, 2017    (GB) ..................................... 1706947

(51) Int. Cl.
| | |
|---|---|
| *G01N 15/14* | (2006.01) |
| *G01N 1/40* | (2006.01) |
| *G01N 15/10* | (2006.01) |
| *G03H 1/00* | (2006.01) |
| *G01N 15/02* | (2006.01) |
| *G01N 33/49* | (2006.01) |

(52) U.S. Cl.
CPC ........... *G01N 15/1429* (2013.01); *G01N 1/40* (2013.01); *G01N 15/1404* (2013.01); *G01N 15/147* (2013.01); *G01N 15/1434* (2013.01); *G01N 2015/1006* (2013.01); *G01N 2015/149* (2013.01); *G01N 2015/1409* (2013.01); *G01N 2015/1454* (2013.01); *G03H 2001/005* (2013.01)

(58) Field of Classification Search
USPC ......................................................... 436/174
See application file for complete search history.

(56) References Cited

U.S. PATENT DOCUMENTS

| | | | | |
|---|---|---|---|---|
| 2010/0035253 | A1* | 2/2010 | Gordon | C12Q 1/6825 435/6.11 |
| 2012/0088295 | A1* | 4/2012 | Yasuda | C12M 47/04 435/288.7 |
| 2013/0078733 | A1* | 3/2013 | Holmes | B01L 3/0217 436/174 |

(Continued)

FOREIGN PATENT DOCUMENTS

| | | |
|---|---|---|
| EP | 2602608 | 6/2013 |
| EP | 2832845 | 2/2015 |

(Continued)

*Primary Examiner* — Matthew D Krcha
*Assistant Examiner* — Brittany I Fisher
(74) *Attorney, Agent, or Firm* — Leason Ellis LLP (57) ABSTRACT

An enrichment system for enrichment of a sample comprising one or more microscopic particles of interest in a fluid carrier is disclosed. The enrichment system comprises a flow cell configured to receive a portion of the sample, a plurality of sample holding chambers and a waste, each connected to a flow cell, an imaging sensor configured to obtain an image of the microscopic particles in the fluid carrier in the flow cell and a controller configured to direct passage of the portion of the fluid sample in the flow cell, in dependence on the image obtained by the imaging sensor, to one of the holding chambers or to the waste.

15 Claims, 5 Drawing Sheets

(56) References Cited

U.S. PATENT DOCUMENTS

| | | | | |
|---|---|---|---|---|
| 2013/0308135 A1* | 11/2013 | Dubois | ................... | G03H 1/00 |
| | | | | 356/457 |
| 2014/0329231 A1* | 11/2014 | Magniette | ............... | B01L 3/502 |
| | | | | 435/5 |
| 2014/0376816 A1* | 12/2014 | Lagae | ................ | G01N 15/1436 |
| | | | | 382/195 |
| 2015/0041325 A1* | 2/2015 | Chiou | ................ | G01N 15/0656 |
| | | | | 204/643 |
| 2016/0097028 A1* | 4/2016 | Tung | ................ | G01N 33/4833 |
| | | | | 435/29 |
| 2016/0340636 A1* | 11/2016 | Tabata | ................... | C12M 47/04 |

FOREIGN PATENT DOCUMENTS

| | | |
|---|---|---|
| EP | 3096125 | 11/2016 |
| WO | WO 98/10267 | 3/1998 |
| WO | WO 2010/113994 | 10/2010 |
| WO | WO 2013/076082 | 5/2013 |
| WO | WO 2014/137475 | 9/2014 |

\* cited by examiner

FLUID SAMPLE ENRICHMENT SYSTEM AND METHOD

CROSS-REFERENCE TO RELATED PATENT APPLICATIONS

The present application claims priority under 35 U.S.C. § 119 to British Patent Application No. 1706947.7, filed May 2, 2017, which is hereby incorporated by reference in its entirety.

FIELD OF THE INVENTION

The present invention relates to a system and method for fluid sample enrichment that is particularly applicable for use in biological cell enrichment and isolation.

BACKGROUND TO THE INVENTION

Enrichment of fluid samples is something that is desirable in a number of fields, although the predominant field of use is in medical testing, measurement and analysis.

The term "enrichment" is generally used to refer to the positive selection of desired particles or the negative depletion of undesired particles from a fluid (typically liquid) suspension. For this to occur there must be some characteristic property or properties that make the particles measurably distinct. In theory particles could be physically distinguishable by their density, size, internal and external form (morphology), and mechanical, magnetic, electrostatic, optical or chemical properties. Enrichment is often a precursor to isolation where a single particle is extracted from many at the end of the enrichment process for use in further experiments In the context of high throughput biological cell identification, the predominant techniques are either biochemically based, or size or density based.

The statistical properties of the sample suspension affect the technique used. Example properties include the respective concentrations of the desired and undesired particles, the diversity of the populations with respect to the properties of individual particles, or liquid viscosity.

There are also numerous characteristics of a technique that make it preferable for a given set of tasks. These include the size, usability and cost of the apparatus, and its performance characteristics such as throughput, sensitivity, or the level of perturbation that the suspended particles undergo.

In early stage cancer, when there is the best chance of effective treatment, Circulating Tumour Cell (CTC) concentration in peripheral blood can be as low as 1 cell per 10 ml. This is incredibly low given the vast background of ~$10^7$ white blood cells and ~$5*10^9$ red blood cells per 1 ml of blood. In later stage cancer, CTC concentration can increase over 100×, and enriching cells from peripheral blood can be a regular low risk alternative to excisional biopsy.

To deal with the low CTC concentration, current techniques employ highly parallel processes to evaluate a huge number of cells. Following initial negative depletion steps (such as removal of red blood cells by lysing) most approaches fall into one of two categories; size based filtration (since tumour cells tend to be larger than blood cells), or surface marker based capture (for example using antibody-conjugated magnetic beads).

Size based filtering such as passing samples through a semi-permeable membrane or microfluidic device, can be cheap and simple. However, tumour cells smaller than the size threshold may pass through, as may deformable large cells. Furthermore, high shear forces are known to damage cell clusters and where these forces have been reduced there remain difficulties in retrieving the clusters after enrichment.

The challenge to antibody capture based techniques is that tumour cells do not consistently express the targeted surface markers (as in the case of epithelial-mesenchymal transition), and such label dependent cell selection approaches are predicated on the relevance of the label to the nature of the underlying cell.

In all cases, a further technique is needed to isolate specific cells for analysis. Such techniques are either slow and manual, such as micro pipetting under microscopy, or require a relatively large and expensive machine such as a Fluorescence Activated Cell Sorter or Imaging Flow Cytometer (that again incur high shear forces) or more recently a DEPArray system.

STATEMENT OF INVENTION

According to an aspect of the present invention, there is provided an enrichment system for enrichment of a sample comprising one or more microscopic particles of interest in a fluid carrier, the enrichment system comprising:
 a flow cell configured to receive a portion of the sample;
 a plurality of sample holding chambers and a waste, each connected to a flow cell;
 an imaging sensor configured to obtain an image of the microscopic particles in the fluid carrier in the flow cell;
 a controller configured to direct passage of the portion of the fluid sample in the flow cell, in dependence on the image obtained by the imaging sensor, to one of the holding chambers or to the waste.

The enrichment system may further comprise a buffer source connected to the flow cell, the buffer source being configured to deliver buffer to the flow cell to direct passage of the portion of the fluid sample from the flow cell to a holding chamber.

The buffer source may also be controllable to deliver buffer to the enriched sample in a holding chamber to return it to a predetermined volume.

The imaging sensor may comprise a digital holographic microscope.

The digital holographic microscope may be a lensless digital holographic microscope and is configured to generate a hologram of substantially the entire portion of the sample in the flow cell.

The controller may be configured to execute a supervised learning system to classify particles in the image of the microscopic particles in the portion of the sample.

The controller may be configured to train and apply the supervised learning system directly on captured holograms.

The holding chambers may be pipettes.

The enrichment system may further comprise a heat regulation system comprising a conductive thermal mass, a temperature sensor, a fan and a heat controller, the conductive thermal mass being thermally connected to the controller, the imaging sensor and the holding chambers, the heat controller being configured to receive temperature readings from the temperature sensor and to control speed of the fan to control temperature of the holding chambers.

One or more of the holding chambers and the flow cell may be disposable consumable parts.

The flow cell may be optically transparent and interposed between the imaging sensor and an illumination system.

The plurality of holding chambers may comprise first and second holding chambers.

The first holding chamber and waste may be connected to the flow cell on one side of the flow cell and the second holding chamber and buffer source are connected to the flow cell on a side of the flow cell opposite to that of the first holding chamber and waste.

The first and second holding chambers and the waste may be connected to the flow cell on a first side of the flow cell, the buffer being connected to the flow cell on a side opposite the first side.

The plurality of holding chambers may be arranged, during operation of the enrichment system, to rotate around their axes of symmetry.

The enrichment system may further comprise spur gears mounted to, or high friction wheels in contact with, each of the holding chambers, the spur gears or wheels being controllable by the controller to rotate the holding chambers.

The controller may be arranged to identify presence of a bubble in the image of the portion of the sample in the flow cell and is arranged to control buffer to flow from the buffer source to the waste to displace the bubble.

The flow cell may be configured to produce a linear flow profile of the fluid passing through the flow cell.

In the context of the present invention, enrichment takes place by processing a sample in portions. Each portion is received and held in a fluid cell. It is then imaged and a decision made on how to further process the portion based on the imaging. For example, if it contains at least one particle of interest it is passed to a holding chamber, if not it is passed to a waste. A sample in the holding chamber can then have buffer added to it and the process repeated, dividing the retained portion into further portions (supplemented in volume by the buffer before division) until only a cell or cells of interest remain. At its most extreme, enrichment can be continued so as to result in isolation of a cell or cells of interest In a preferred embodiment, pipettes are used to controllably introduce the portion into the flow cell. When there is no net flow the flow cell is in effect sealed (in the sense that there is control over what can pass in or out of it). Optionally, valves or other seals could be used.

The enrichment system may further comprise a buffer source connected to the flow cell, the buffer cell being configured to deliver buffer to the enriched sample to return it to a predetermined volume.

Preferably, the imaging sensor comprises a digital holographic microscope.

The digital holographic microscope may be a lensless digital holographic microscope and is configured to generate a hologram of substantially the entire portion of the sample in the flow cell.

The controller may be configured to execute a supervised learning system to classify particles in the image of the microscopic particles in the portion of the sample.

The controller may be configured to train the supervised learning system directly from captured holograms.

The holding chambers may be pipettes. Preferably, the pipettes have positive displacement pipette tips that allow the aspiration force to remain constant One or more of the holding chambers and the flow cell may be disposable consumable parts.

The flow cell is preferably optically transparent and is preferably interposed between the imaging sensor and an illumination system.

The plurality of holding chambers may comprise first and second holding chambers.

The first holding chamber and waste may be connected to the flow cell on one side of the flow cell and the second holding chamber and buffer source are connected to the flow cell on a side of the flow cell opposite to that of the first holding chamber and waste.

The first and second holding chambers and the waste may be connected to the flow cell on a first side of the flow cell, the buffer being connected to the flow cell on a side opposite the first side.

The plurality of holding chambers may be arranged, during operation of the enrichment system, to rotate around their axes of symmetry. While this rotation is optional, it advantageously aids the system to achieve even mixing of the suspended particles in the liquid carrier.

The enrichment system may further comprise spur gears mounted to, and/or high-friction wheels in contact with, each of the holding chambers, the spur gears and/or wheels being controllable by the controller to rotate the holding chambers around their axes of symmetry.

The controller may be arranged to identify presence of a bubble in the image of the portion of the sample in the flow cell and is arranged to control buffer to flow from the buffer source to the waste to displace the bubble.

The flow cell may be configured to produce a linear flow profile of the fluid passing through the flow cell. For example, the flow profile perpendicular to the direction of flow and horizontal (the y axis if flow is along x and illumination is vertical along z) can be made linear. This may be done by having regions either side of the imaged part of the flow cell where the depth is greater than in the imaged volume. This has the effect of equalising the fluid pressure over the entry and exit faces of the chamber.

According to another aspect of the present invention, there is provided a method of fluid sample enrichment comprising:

a) passing at least a portion of the fluid sample into a flow cell;
b) imaging the portion of the fluid sample in the flow cell;
c) controlling passage of the portion out of the flow cell in dependence on said imaging;

and repeating steps a) to c) until a predetermined number or proportion of particles of interest remain in the portion, wherein said step of controlling includes:

selecting one of a plurality of outlets from the flow cell in dependence on said imaging to selectively dispose of or retain the portion, retaining the portion if it comprises at least one particle of interest.

Preferably, the method includes the step of d) diluting the retained portion after step c.

The method may include repeating steps a) to c) until a single particle is isolated.

Although the description set out below concentrates on cells in a liquid suspension, it will be appreciated that embodiments of the present invention are applicable to enrichment and isolation of other microscopic particles in fluid carriers. Embodiments typically can process particles and clusters of particles in the order of 1-100 um. Organic and inorganic particles (such as inanimate particles) can be processed. Size of particles that can be handled is generally dependent on the enrichment apparatus and imaging techniques used and as these develop, the approach set out in the presently claimed invention can also be applied to smaller or larger particles as desired.

In selected embodiments of the present invention automated depletion of undesired particles can be performed so as to be below a threshold concentration, without unacceptable depletion of the desired particles, prior to enrichment within the instrument. However, this need not be done in the enrichment system. In the case of enriching CTCs from blood, this is done by the preliminary depletion of red blood cells.

In embodiments of the present invention, depletion is controlled by a controller such as a processor or other computing device or system that is guided by imagery from an imaging sensor of a flow cell into which the sample is passed and subsequently directed onwards by the controller. Identifying distinct particle types is performed using the imagery rather than chemical or physical properties or interaction of the particles.

Due to the use of an imaging sensor and control based on captured images, embodiments of the present invention are exceptionally versatile and extensible. A user can easily change the features by which they enrich particles. For the specific case of CTC enrichment and isolation, embodiments can be programmed by a scientist, clinician or other operator and can affordably isolate up to 1000 undamaged CTCs or clusters, such that a maximal range of post isolation experimental techniques can be applied.

Embodiments of the present invention are particularly suitable to low-cost operation and, preferably, embodiments utilise standardised chambers and disposable positive displacement pipette tips.

In preferred embodiments, the imaging sensor is configured as a digital holographic microscope. Preferably, a hologram is recorded on a standard digital image sensor, illumination and optics being configured to produce a hologram rather than a standard focussed image.

Preferably, the controller executes an image classification algorithm based on the captured imaging data to identify particles of interest.

Most preferably, the image classification algorithm includes a machine learning algorithm such as an artificial neural network, genetic programming, Bayesian network, decision tree or other machine learning approach. Preferably, classification algorithms are trained directly from and applied directly to captured holograms, cutting out the computationally expensive image reconstruction step and substantially increasing throughput.

The controller preferably has a threshold or other mechanism for determining when sufficient enrichment has occurred (for example when only the particle (or particles) of interest is/are imaged in the flow cell). The sample may then be directed to a particular chamber for removal and further testing/use of the isolated particle(s). The controller may highlight the selected chamber by some mechanism, for example via a user interface or illumination of an LED next to the chamber.

Using Digital Holographic Microscopy (DHM), morphological contrast of cells can be gained from the light phase information, so, advantageously, labelling of otherwise transparent cells may not be required and this avoids associated effects such as cell death or effect on functionality. With DHM, cells need not be fixed for a sequential 'z-stack' of images in a deep 3D volume, or constrained to a monolayer for 2D imaging if moving laterally. It also means a CTC cluster (with a diameter many times greater than the depth-of-field of a conventional objective lens) may be resolved fully from a single hologram. All apertures are larger than the particles being handled and flow speeds low, so damaging shear forces are avoided unlike in typical microfluidics systems that process cells sequentially.

Embodiments of the present invention preferably use computer vision algorithms to reproducibly and rapidly evaluate cells directly from their holograms. A by-product of this approach is precise particle volume measurements, meaning the approach subsumes size based filtering techniques (though often with lower throughput). In contrast with the predominant enrichment techniques for which physical components (specific filters or antibodies) must be replaced in order to change the target, embodiments of the present invention seek to be able to enrich alternative sample subsets simply by switching the operating algorithms.

In the case of blood sample depletion, DHM imaging relies on information contained in the scattered light field to distinguish malignant cell types from benign white blood cells. Preferably, the hardware components involved in imaging and signal to noise ratio is optimised so as to capture the most amount of useful information for use by the controller by machine learning or one of the other approaches discussed.

In preferred embodiments, a portion of the sample is passed into a flow cell and is imaged whilst in the flow cell. The portion can contain one or a plurality of particles. It should be noted that in the case of a typical sample, there may be many (e.g. 10000) cells in the flow cell at any one time, not just one at a time. Embodiments of the present invention are configured to apply imaging, vision and machine learning approaches to enable a particle of interest to be identified and isolated in a substantially automated manner (although it may have an operator to oversee or provide further guidance).

The controller directs the portion of the sample into one of a plurality of holding chambers or into a waste chamber in dependence on analysis of the captured image. For example, if a particle of interest is found during imaging to be in the flow cell then the sample portion with the particle of interest and all the other cells also in the flow cell at that time is directed to a second holding chamber. If not, the sample portion in the flow cell can be directed to the waste without the need of the second chamber. This process is repeated for further sample portions until the first chamber is empty, at which time the remaining sample in the second holding chamber is diluted with buffer and the process could be reversed, sent from second chamber back to first or the whole of the content of the second chamber can be returned to the first chamber and the process repeated.

It will be appreciated that the flow cell and chamber arrangement described can be varied. For example, more chambers may be provided, access to the waste could be from the chambers rather than the flow cell etc. The described arrangement is preferred as it is a particularly simple and cost effective arrangement in which to operate embodiments of the present invention. In preferred embodiments, the flow cell, and sample, buffer and waste chambers are all disposable. The chambers may be positive displacement pipette tips. The buffer and waste chambers may alternatively be higher capacity reservoirs. The buffer chamber (which may be a pipette tip) is connected to the flow cell and controlled by the controller to provide a dilutant/buffer such that the sample can be topped up and approximately the same volume operated upon even after multiple rounds of enrichment through the flow cell.

Instead of the entire pipettes being disposable, they may have disposable tips that connect to the flow cell (and be remainder of the pipette removable from the system for cleaning/sterilisation).

Embodiments of the present invention enable multiple (suspended) particles to be evaluated in parallel from the same single hologram/image. This significantly reduces processing time and allows automated decision making and enhancement or isolation to take place without an operator or supervision or in the case where a supervised learning algorithm is used with minimal user input.

Many existing cell imaging systems operate by creating a single file cell flow past an imager. For example, cells in a sample may be directed to flow under pressure along a channel during which time they pass an imager. Such an arrangement requires cells to be manipulated individually and also speed of processing to be sufficient to process cells as they pass by the imager in the flow. In contrast to such systems, embodiments of the present invention sequentially process portions of a sample in a flow cell. Once one portion has been processed, another can be dealt with. Such an arrangement requires neither the single file organisation (or processing infrastructure to create it), avoids exposing cells to potentially damaging pressure and shear forces that a pressure based flow may use, and enables processing of different complexities to be undertaken (or repeat processing where there is uncertainty) as the arrangement is not dependent on imaging within a certain time window. Furthermore, embodiments of the present invention can be less complex since moving portions of a fluid carrier is technically less challenging than creating a single file flow and manipulating cells individually.

This reduced complexity typically translates to a cheaper, and potentially more robust device given it is not exposed to mechanical and pressure strains of systems creating single file cell flows, for example.

Furthermore, compared to an imaging flow cytometer, embodiments of the present invention are typically cheaper to produce and advantageously can be produced so as to enable all internal surfaces to be replaceable and therefore preclude cross contamination of samples.

Additionally, in embodiments of the present invention the internal apertures (openings that particles flow through) can be larger than in a cytometer, meaning potentially damaging shear forces are reduced and a greater range of particle sizes can be processed.

BRIEF DESCRIPTION OF THE DRAWINGS

Embodiments of the present invention will now be described by way of example only with reference to the accompanying drawings, in which.

DETAILED DESCRIPTION

Figure 1:
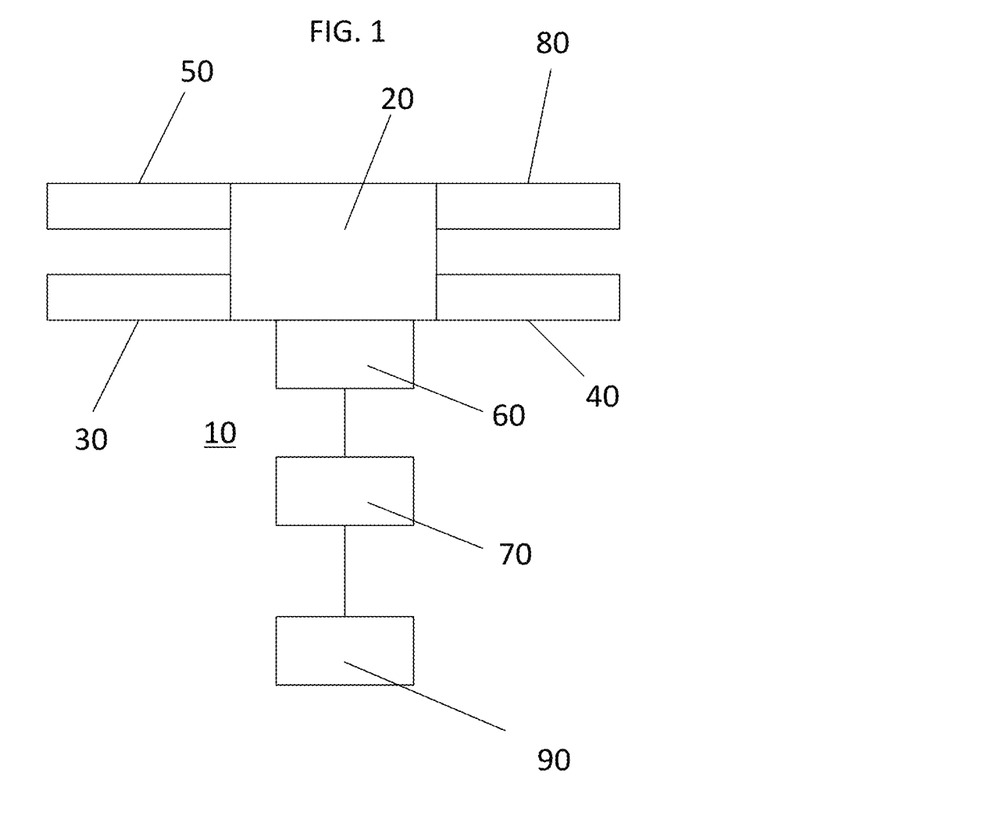
FIG. 1 is a schematic diagram of a fluid sample enrichment system according to an embodiment.

FIG. 1 is a schematic diagram of a fluid sample enrichment system according to an embodiment.

The fluid sample enrichment system 10 comprises a flow cell 20, a first and second sample holding chambers 30, 40, a waste 50 and a buffer source 80, each connected to the flow cell 20.

The flow cell 20 is configured to receive a sample comprising one or more microscopic particles of interest suspended in a fluid carrier. The sample may be loaded via the first or second sample holding chamber 30, 40, for example.

The fluid sample enrichment system also includes an imaging sensor 60 and a controller 70. The imaging sensor 60 is directed at the flow cell 20 and configured to obtain an image of the microscopic particles in the fluid carrier in the flow cell 20. The controller 70 is configured to direct passage of at least a portion of the fluid sample into or out of the flow cell 20 to one of the holding chambers 30, 40, to the waste 50 or direct buffer from the buffer source 80 into the flow cell. The controller 70 directs passage of the portion of the sample in dependence on the image obtained by the imaging sensor 60, to one of the first or second holding chambers 30, 40 or to the waste 50. The buffer would be directed to whichever holding chamber held the depleted sample.

The holding chambers 30, 40, waste 50 and buffer source 55 may be pipettes. Each may be pipetting robots.

Figures 2A, 3A:
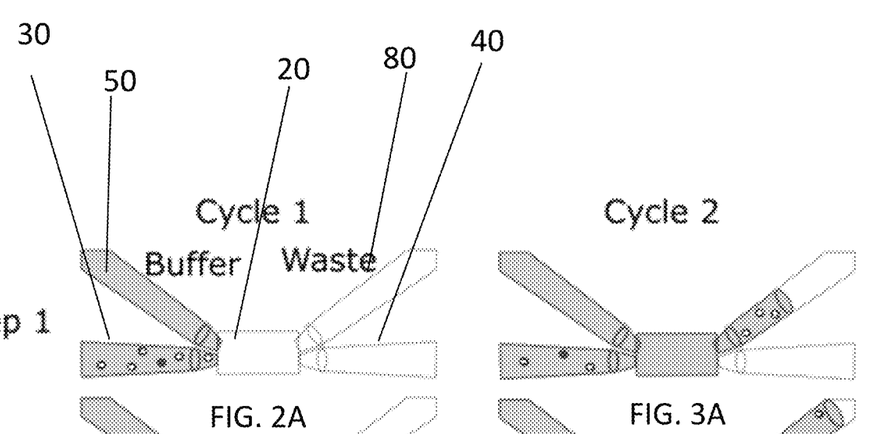

In the case of a blood sample, the system 10 may be operated as follows with reference to FIGS. 2a to 3d. Fresh positive displacement pipette tips and a flow cell are loaded. The buffer source 80 is taken out of the system 10, aspirated to fill it with buffer and connected to the flow cell 20. A fresh blood sample is taken. A standard protocol is preferably followed to deplete red blood cells, leaving all nucleated cells. The blood is preferably diluted and then loaded into the first holding cell 30 in the same way as for the buffer source 80. The system 10 is in an initial state as shown in FIG. 2a. The following automated process is then started, preferably via a user interface 90.

In the illustrated embodiment, elements work pairwise—one element (for example a chamber) being controlled to dispense (release) its content, another (for example the other chamber) to aspirate (draw in). Pressures are maintained by the pairwise action. For example, the second chamber draws in air from the flow cell to compensate for the sample being introduced by the first chamber and keep pressures substantially constant.

Preferably, the portion of the sample passed into the flow cell during each iteration corresponds substantially to the capacity of the flow cell. In one embodiment, the flow cell has a volume of 10 µl.

Dispensing and aspiration may be via stepper motors, for example under the control of the controller 70—each stepper motor substantially simultaneously actuating its respective pipette to aspirate or dispense the desired volume. In this way, the amount of liquid dispensed is the volume of the flow cell (such that all particles in the flow cell are replaced for each iteration).

Figure 2B:
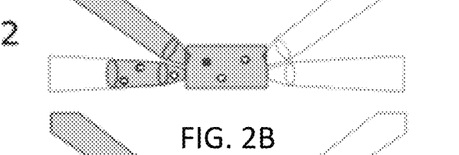
Figure 2C:
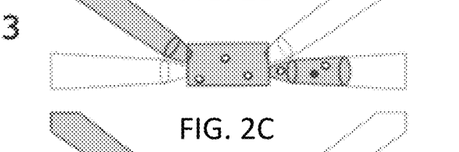
Figure 2D:
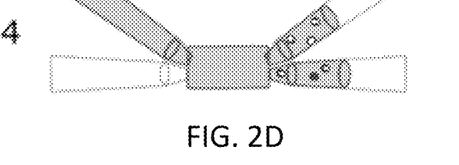
Figure 3B:
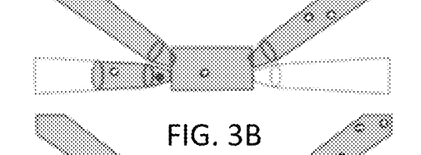
Figure 3C:
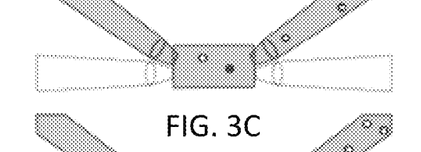
Figure 3D:
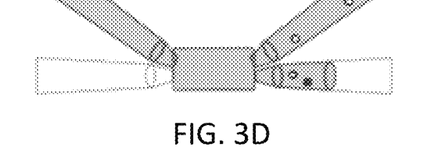

Example iterations are shown in FIG. 2b-2d in which the sample in the first holding chamber 30 is dispensed in steps and directed either to the waste 50 or the second holding chamber 40 depending on what is imaged whilst it is in the flow cell 20. It can be seen that in the first step (FIG. 2b), the particle of interest (red) is dispensed and is therefore directed in the second step (FIG. 2c) into the second holding chamber 40 while the remainder of the sample is dispensed into the flow cell 20. In the third step (FIG. 2d), the remaining sample has no particle of interest and is directed to the waste 50.

FIG. 3a shows the sample with the particle of interest after having been returned to the first holding chamber 30 and buffer from buffer source 80 introduced. The same process is then repeated on the sample as discussed above in FIGS. 3b-3d. It will be appreciated that this cycle can be repeated as many times as needed, for example until the particle of interest can be isolated.

Preferably the imaging sensor 60 is operated as a digital holographic microscope. Although the image sensor itself may be a standard imaging sensor such as a Charge Coupled Device, CMOS or other imaging sensor, the optics directing the image to the sensor are preferably such that a hologram rather than a focused image is created. A hologram of the fluid sample in the flow cell 20 is recorded by the imaging sensor 60. The controller 70 analyses the hologram for presence of a particle of interest using one or more of a number of approaches such as machine learning, artificial intelligence, computer vision etc. As discussed above, if a particle such as a cell of interest is present, the content of the flow cell 20 is flowed into the second chamber 40. If no particle of interest is detected from the hologram, the content of the flow cell 20 is flowed into the waste pipette 50. This process is repeated until the first holding chamber 30 is empty. At this point, the second holding chamber 40 is topped up with diluting buffer from the buffer source 80 and its contents returned to the first holding chamber 30 for the process to start over. The cycle is repeated until a satisfactory proportion of background particles has been removed. This can be estimated based on the number of enrichment cycles (considering the proportion of the volumes that contained a particle of interest), or measured through image analysis.

At this point, the particle(s) of interest may be isolated. Isolation is by drawing from the second holding chamber 40 to the first holding chamber 30 on average a ratio of <1 particle of interest per chamber into pipette (and flowing back when >1 for remixing). The first holding chamber 30 can be removed from the instrument and used to dispense all enriched cells or isolate and dispense individual cells.

The pipette tips and the flow cell are preferably consumables and replaced between samples. Through the process, vast sample information is gained, stored in a data repository, and easily accessed.

In embodiments of the present invention, enrichment is made possible via imaging, and particles are distinguished computationally via their morphology. Malignant cells are known to present anomalous morphology such as increased nuclear to cytoplasmic ratio due to over expression of DNA, increased size, and unsmooth surfaces.

Embodiments preferably record holograms of thousands of cells in parallel with a large digital sensor and send the entire liquid volume one way or another based on the presence or absence of a rare particle. This is repeated until the whole sample volume has been sorted, then the chamber with rare cells is diluted and the cycle restarted. In this way the background cells are depleted at a predictable rate. Ultimately, the viable rare cells are drawn back one at a time, directly into a pipette ready for dispensing.

Two of the machine learning approaches that may be used are 'supervised learning', where a classification algorithm is trained imaging pre-classified samples of white blood cells and tumour cells, and 'anomaly detection', where an algorithm is trained on imaging of the blood of a healthy donor and atypical (anomalous) particles are enriched when viewing blood of a cancer patient.

The dimensions of the imaging sensor including pixel size and resolution can be tuned to capture enough morphological information for classification, while minimising the data generated and hence maximise hologram processing rate and instrument throughput.

Figure 4:
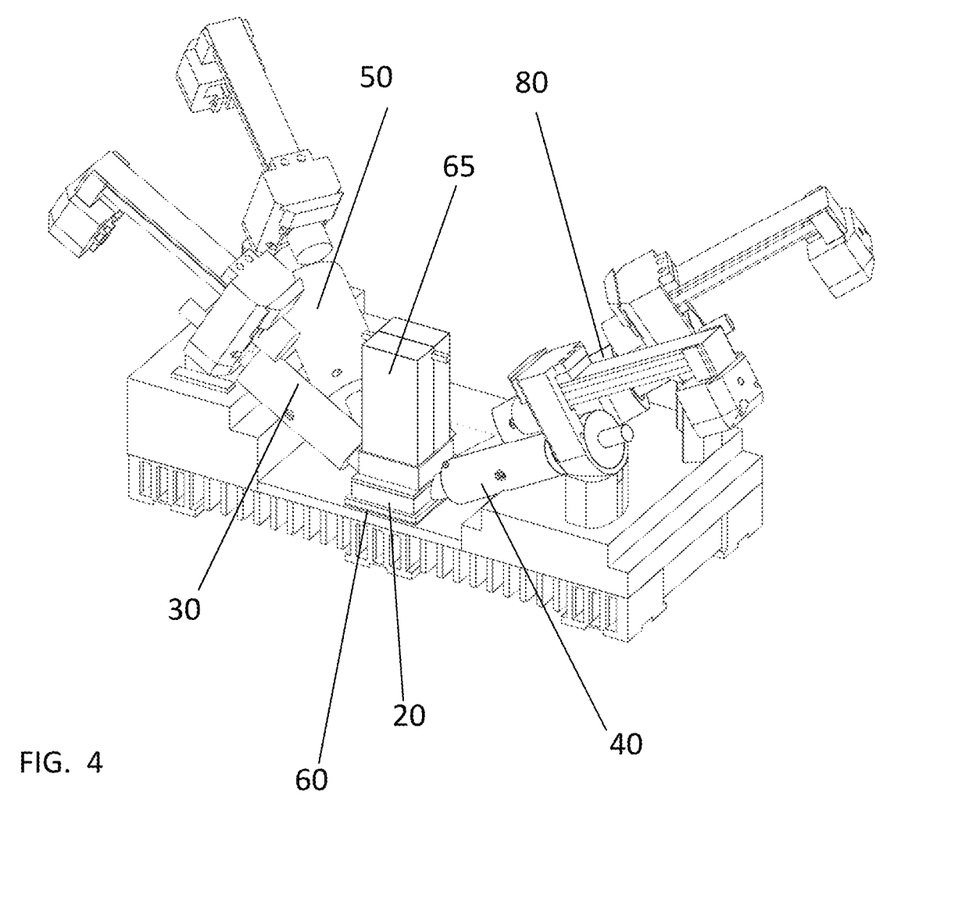

FIG. 4 is a perspective view of a fluid sample enrichment system according to one embodiment. The holding chambers 30, 40 and waste 50 and buffer source 80 are positioned in this embodiment in pairs on opposing sides of the flow cell 20.

In this embodiment, the system works by simultaneous aspiration and dispensing of two of the four pipettes at any one time, resulting in liquid flow through a central imaging flow cell. The pipettes and flow cell are all consumables and are replaced for each new sample. The pipettes and their actuators can each be removed to allow aspirating or dispensing from out of the system, for example when aspirating a sample prior to loading into the instrument for analysis. Preferably, there are two 1 ml pipettes that handle the enrichment sample, and two 10 ml pipettes, one that holds buffer and the other holding waste (negatively depleted particles).

Various approaches may be used to aspirate/dispense the pipettes. In a preferred embodiment, stepper motors with screw drives are controlled by the controller to actuate the pipette pistons within the outer tubes.

In one embodiment, the flow cell may be 3D printed from an optically clear material. This will enable precise refinement of flow cell geometry. This approach may be retained for use in regions where consumables are difficult to have shipped. In some embodiments the parts may be injection moulded.

The flow cell 20 is preferably sandwiched between the image sensor 60 (preferably mounted on the base and protected by its own coverslip) and an illumination tower 65 above. In a preferred embodiment, the tower contains an LED at a position furthest from the flow cell in its top, a pinhole and at least one aperture that cuts out unwanted light rays. The beam that then passes through the sample in the flow chamber is a spherical wave, with an intermediate coherence length which enables good holograms to be produced. The coherence length must be long enough to produce interference patterns of the sample particles, but not so long that fringes are generated from scattering and diffraction earlier in the optical train. This scheme is called lensless DHM. The system can be made such that there is very little physical magnification of the light field, since no lenses are used and the illumination can approximate a plane wave (when the radius of curvature is large relative to the sample to sensor distance). This means a very large field of view can be recorded on the sensor and many particles can be classified in parallel. Effective magnification can be gained by using tiny pixels, on the order of $1um^2$ in area. Having so few components also makes the optics cheap and robust. Approximating a plane wave may be done, for example, to achieve a low physical magnification and hence image more particles and achieve a higher throughput The controller 70 preferably includes or is connected to a graphics processor such as a computer optimised for graphics processing. The controller 70 also interfaces to electronics for driving the stepper motors. The controller controls the driver electronics and the image sensor. The whole system is preferably run at 12 Volts which is relatively safe.

A web server is preferably run by the controller or an associated computer system which provides remote access to a user interface and allows full remote control of the system 10 from a client computer via a webpage. Optionally, data storage and processing may be done remotely such as in a private cloud network.

Preferably, during operation the outer pipette tubes are rotated (around their axis of symmetry) to constantly mix the suspension and avoid settling of particles and the aggregation and adhesion to the inner walls that results. This rotation can be achieved by connection through friction wheels or spur gears mounted on the pipette tubes and the rotating screw of the stepper motors that drive the pistons (this means extra electronics are not required).

Preferably the outer pipette tubes are mounted with their axes of symmetry substantially horizontal, which achieves improved mixing.

Preferably the outer pipettes are in contact with a thermally conductive mass, such as a block of aluminium that regulates the internal liquid temperature, for example to 37 degrees c. The thermal mass' temperature can be controlled by physical contact with the internal computer and imaging sensor (that produce an excess of heat). For example, its temperature may be measured via temperature sensors built into the computer, and its temperature cooled by a fan mounted onto a section of the thermal mass with holes drilled in it to increase heat transfer, a heat pipe or other cooling arrangement. The appropriate fan speed can be controlled automatically based on temperature readings. This system is preferable in that it reduces the number of components necessary to maintain physiological temperature of the fluid sample and to cool the computer and sensor.

Preferably, the buffer and waste pipettes have larger apertures and are capable of higher flow rates than the enrichment pipettes and are positioned on opposite sides of the flow cell. Preferably, the hologram classification software is trained to identify when bubbles are present and flowing directly from the buffer pipette to waste pipette as necessary. This assists in displacing bubbles in the flow cell.

Preferably, the flow cell is configured to produce a linear flow profile (horizontally orthogonal to the direction or flow) of the liquid passing through the flow cell. This aids efficiency of the technique since ideally one would entirely empty and refill the liquid in the viewing chamber each time the system steps. A parabolic flow profile may cause particles near the side walls to linger in the chamber for many steps. In one embodiment, this is achieved by incorporating end wells on either side of the flow cell, with greater height than the chamber itself (which is currently 400 um high). These have the effect of rapidly equalising the pressure along the (rectangular entrance to the (cuboid) viewing chamber, such that the effect of the small pipette tip apertures (of making a non-linear jet) is nullified. The geometry of the end wells is preferably optimised to minimise their volume and the likelihood of circulating currents.

FIGS. 5A-D are schematic diagrams (not to scale) of aspects of a fluid sample enrichment system according to another embodiment. While many features of the system 10 are in common to that of the system of FIG. 4, the positioning of the pipettes differs.

Figure 5A:
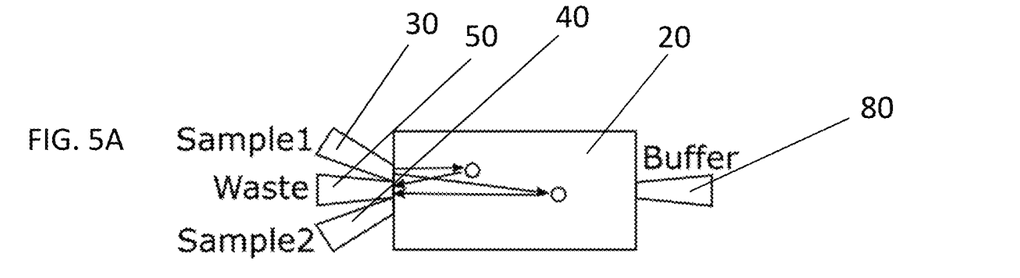
Figure 5B:
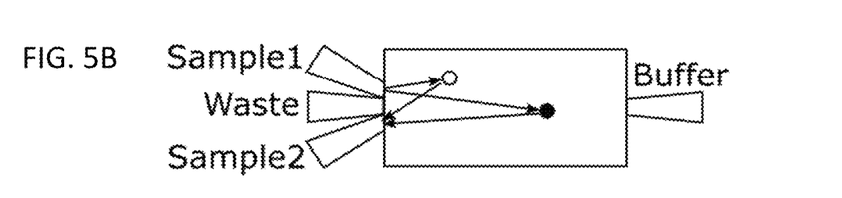

In FIGS. 5A and B, the flowing of particles from one chamber 30 into the flow cell 20 and then their aspiration back into the other chamber 40 after a hologram is acquired by the imager (not shown), analysed by the controller (not shown) for the presence of a particle of interest. It can be seen that due to a nonlinear flow profile particles travel at different speeds for the period of the flow actuation, and end up at different displacements along the flow cell 20. When the sample in the flow cell 20 is aspirated back in the opposite direction, with flow from the buffer source, the particles again travel at these different speeds but have correspondingly different distances to cover and reach the aspirating chamber at the same time. This significantly increases the efficiency of the fluidic process since the effect of nonlinear flow profile is negated and a higher proportion of the particles that enter the flow cell will leave (fewer particles will linger in the flow cell for many iterations due to their relatively slow flow speeds).

In FIG. 5A, there are no particles of interest and the suspension is aspirated into the waste chamber 50.

In FIG. 5B, there is a particle of interest and the suspension is aspirated into the second holding chamber 40.

Figure 5C:
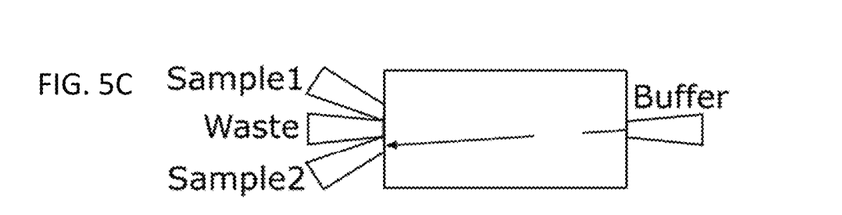

In FIG. 5C, the second holding chamber 40 is diluted from the buffer source 80.

Figure 5D:
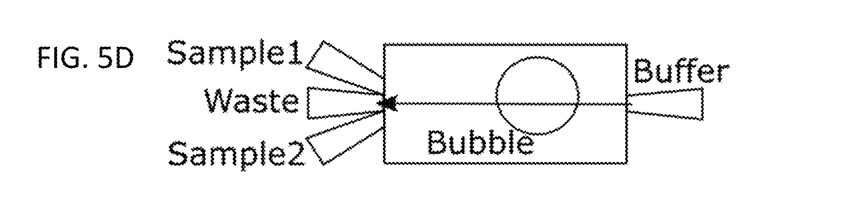

In FIG. 5D, a bubble is removed from the flow cell 20 by a rapid actuation from the buffer to the waste chamber.

Figure 6:
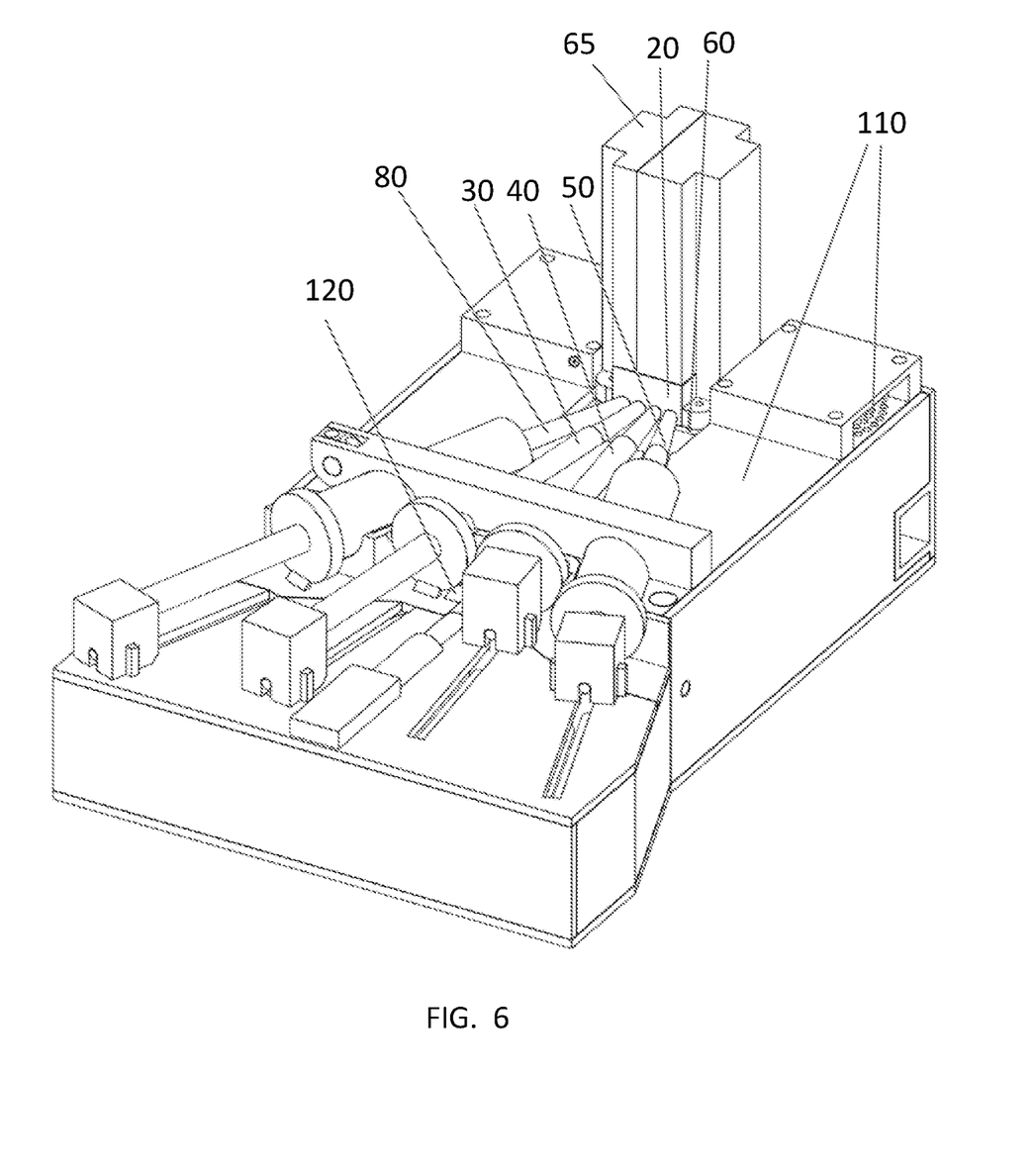

FIG. 6 is a schematic diagram of another embodiment of a fluid sample enrichment system.

Many of the features are common to earlier embodiments and common features use the same reference numerals. In this embodiment, all pipettes are arranged to lay flat (in the horizontal plane) in the same plane. Having all the pipettes flat advantageously means that the two pipettes that need mixing could both be rotated by a single wheel 120. Rotational mixing is also more effective when pipettes are horizontal.

Cooling of electronics and maintenance of sample temperature at 37 C. in this embodiment is preferably achieved by using inbuilt temperature sensors (preferably those of the controller such that further sensors are not needed) and its fan, connected to a block of aluminium 110 that is in touch with the fluidic components.

It is to be appreciated that certain embodiments of the invention as discussed below may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

The invention claimed is:

1. An enrichment system for enrichment of a fluid sample comprising one or more microscopic particles of interest in a fluid carrier, the enrichment system comprising:
    a flow cell configured to receive a portion of the fluid sample;
    a plurality of sample holding chambers and a waste, each connected to the flow cell;
    an imaging sensor configured to obtain an image of the microscopic particles in the fluid carrier in the flow cell;
    a controller configured to direct passage of the portion of the fluid sample in the flow cell, in dependence on the image obtained by the imaging sensor, to one of the sample holding chambers or to the waste; and
    a heat regulation system comprising a conductive thermal mass, a temperature sensor, a fan and a heat controller, the conductive thermal mass being thermally connected to the controller, the imaging sensor and the holding chambers, the heat controller being configured to receive temperature readings from the temperature sensor and to control speed of the fan to control temperature of the holding chambers.

2. An enrichment system for enrichment of a fluid sample comprising one or more microscopic particles of interest in a fluid carrier, the enrichment system comprising:

a flow cell configured to receive a portion of the fluid sample;

a plurality of sample holding chambers, a buffer source and a waste, each connected to the flow cell;

an imaging sensor configured to obtain an image of the microscopic particles in the fluid carrier in the flow cell; and a controller configured to direct passage of the portion of the fluid sample in the flow cell, in dependence on the image obtained by the imaging sensor, to one of the sample holding chambers or to the waste, wherein the plurality of holding chambers comprise first and second sample holding chambers, and wherein the first sample holding chamber and waste are connected to the flow cell on one side of the flow cell and the second sample holding chamber and the buffer source are connected to the flow cell on a side of the flow cell opposite to that of the first sample holding chamber and waste.

3. An enrichment system for enrichment of a fluid sample comprising one or more microscopic particles of interest in a fluid carrier, the enrichment system comprising:

a flow cell configured to receive a portion of the fluid sample;

a plurality of sample holding chambers, a buffer source and a waste, each connected to the flow cell;

an imaging sensor configured to obtain an image of the microscopic particles in the fluid carrier in the flow cell; and a controller configured to direct passage of the portion of the fluid sample in the flow cell, in dependence on the image obtained by the imaging sensor, to one of the sample holding chambers or to the waste, wherein the plurality of holding chambers comprise first and second sample holding chambers, and wherein the first and second sample holding chambers and the waste are connected to the flow cell on a first side of the flow cell, the buffer source being connected to the flow cell on a side opposite the first side.

4. The enrichment system of claim 3, wherein the buffer source is configured to deliver buffer to the flow cell to direct passage of the portion of the fluid sample from the flow cell to one of the sample holding chamber.

5. The enrichment system of claim 3, wherein the imaging sensor comprises a digital holographic microscope.

6. The enrichment system of claim 5, wherein the digital holographic microscope is a lensless digital holographic microscope and is configured to generate a hologram of substantially the entire portion of the sample in the flow cell.

7. The enrichment system of claim 3, wherein the controller is configured to execute a supervised learning system to classify particles in the image of the microscopic particles in the portion of the sample.

8. The enrichment system of claim 7, wherein the controller is configured to train and apply the supervised learning system directly on captured holograms.

9. The enrichment system of claim 3, wherein the holding chambers are pipettes.

10. The enrichment system of claim 3, wherein, one or more of the sample holding chambers and the flow cell are disposable consumable parts.

11. The enrichment system of claim 3, wherein the flow cell is optically transparent and is interposed between the imaging sensor and an illumination system.

12. The enrichment system of claim 3, wherein the flow cell is configured to produce a linear flow profile of the fluid passing through the flow cell.

13. An enrichment system for enrichment of a fluid sample comprising one or more microscopic particles of interest in a fluid carrier, the enrichment system comprising:

a flow cell configured to receive a portion of the fluid sample;

a plurality of sample holding chambers and a waste, each connected to the flow cell;

an imaging sensor configured to obtain an image of the microscopic particles in the fluid carrier in the flow cell; and a controller configured to direct passage of the portion of the fluid sample in the flow cell, in dependence on the image obtained by the imaging sensor, to one of the sample holding chambers or to the waste, wherein the plurality of holding chambers comprise first and second sample holding chambers, and wherein the plurality of sample holding chambers are arranged, during operation of the enrichment system, to rotate around their axes of symmetry.

14. The enrichment system of claim 13, further comprising spur gears mounted to, or high friction wheels in contact with, each of the sample holding chambers, the spur gears or wheels being controllable by the controller to rotate the sample holding chambers.

15. An enrichment system for enrichment of a fluid sample comprising one or more microscopic particles of interest in a fluid carrier, the enrichment system comprising:

a flow cell configured to receive a portion of the fluid sample;

a plurality of sample holding chambers, a buffer source and a waste, each connected to the flow cell;

an imaging sensor configured to obtain an image of the microscopic particles in the fluid carrier in the flow cell; and a controller configured to direct passage of the portion of the fluid sample in the flow cell, in dependence on the image obtained by the imaging sensor, to one of the sample holding chambers or to the waste, wherein the plurality of holding chambers comprise first and second sample holding chambers, and wherein the controller is arranged to identify presence of a bubble in the image of the portion of the sample in the flow cell and is arranged to control buffer to flow from the buffer source to the waste to displace the bubble.

* * * * *